United States Patent
Noguchi et al.

(10) Patent No.: US 6,636,272 B1
(45) Date of Patent: Oct. 21, 2003

(54) REMOTE CONTROL APPARATUS AND IMAGE DISPLAY APPARATUS

(75) Inventors: Fujio Noguchi, Tokyo (JP); Takayuki Shiomi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/509,156

(22) PCT Filed: Jul. 26, 1999

(86) PCT No.: PCT/JP99/03982

§ 371 (c)(1), (2), (4) Date: Mar. 22, 2000

(87) PCT Pub. No.: WO00/07405

PCT Pub. Date: Feb. 10, 2000

(30) Foreign Application Priority Data

Jul. 27, 1998 (JP) .......................................... 10-211528

(51) Int. Cl.[7] ................................................ H04N 5/44
(52) U.S. Cl. .................................. 348/734; 340/825.72
(58) Field of Search ................................. 348/734, 552, 348/725, 731; 340/825.72, 825.69; H04N 5/44

(56) References Cited

U.S. PATENT DOCUMENTS

| 5,214,622 A | * | 5/1993 | Nemoto et al. | ......... 340/825.69 |
| 5,235,328 A | * | 8/1993 | Kurita | .................... 340/825.72 |
| 5,353,016 A | * | 10/1994 | Kurita et al. | .......... 340/825.22 |
| 6,069,672 A | * | 5/2000 | Claassen | ................ 340/825.69 |

* cited by examiner

*Primary Examiner*—Michael H. Lee
(74) *Attorney, Agent, or Firm*—Jay H. Maioli

(57) ABSTRACT

A remote control apparatus and an image display apparatus for example, a television receiver and a remote commander for remote controlling the television receiver in which for example, a version-up of a control program can be easily executed. The remote control apparatus 2 can be constructed so that an IC card 3 can be loaded and data recorded in the IC card 3 is transmitted to control-target equipment.

4 Claims, 7 Drawing Sheets

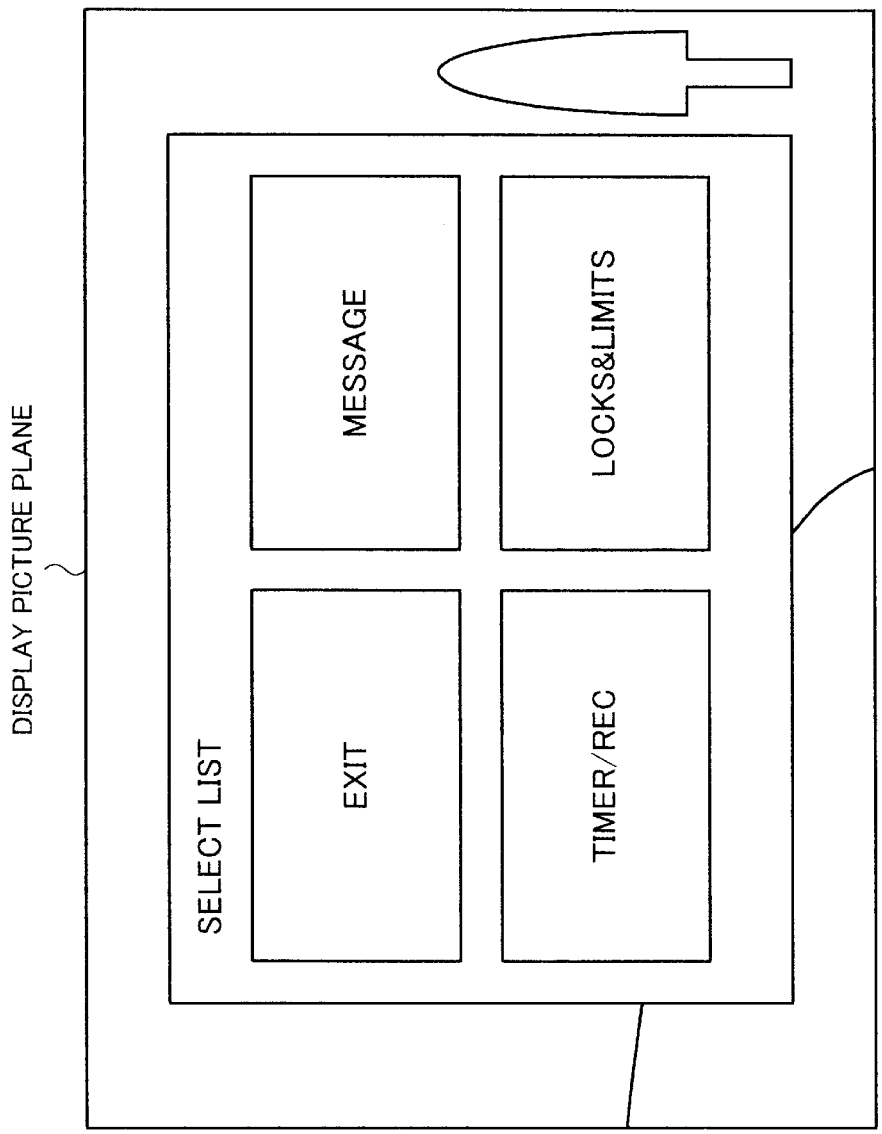

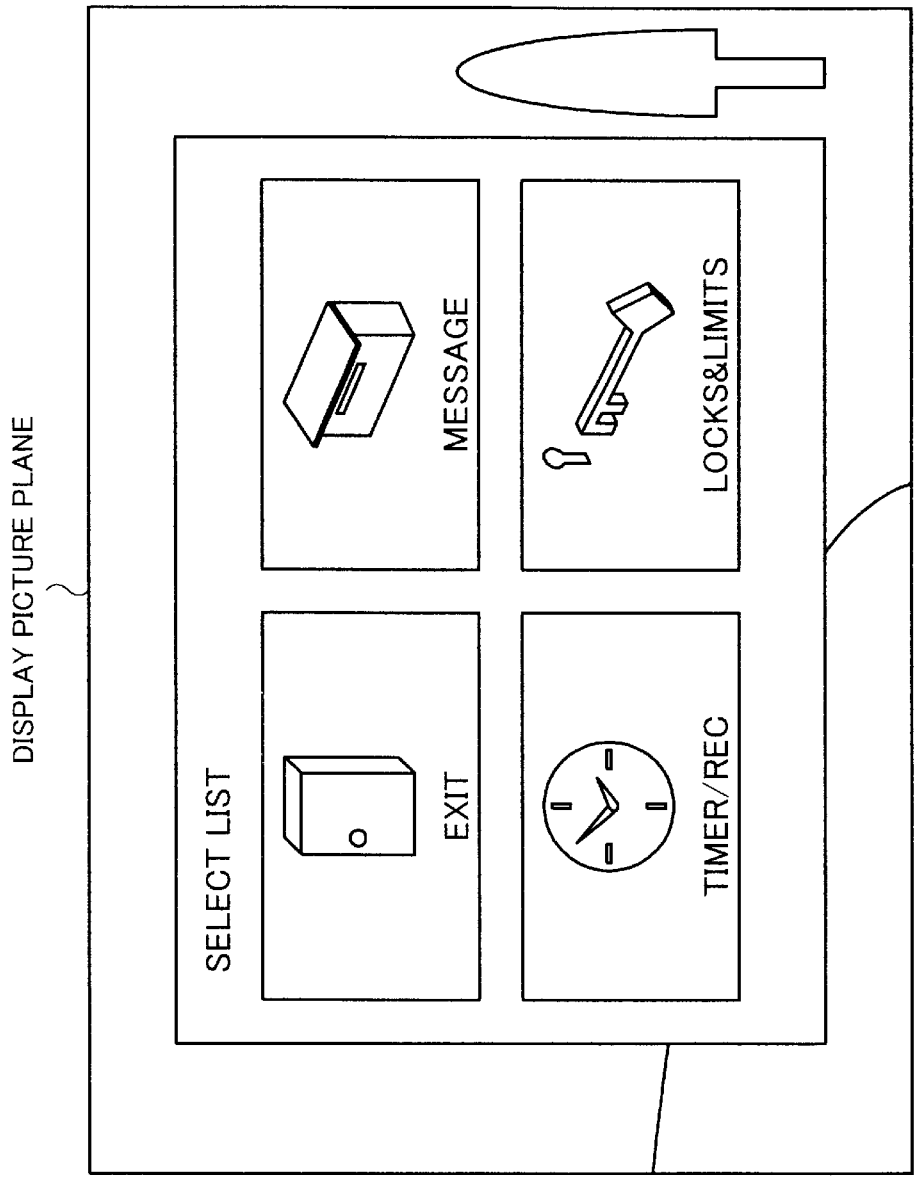

REMOTE CONTROL APPARATUS AND IMAGE DISPLAY APPARATUS

TECHNICAL FIELD

The present invention relates to a remote control apparatus suitable for remote controlling an image display apparatus such as a television receiver and relates to an image display apparatus such as a television receiver which is controlled by the remote control apparatus.

BACKGROUND ART

A remote control apparatus is used to remote control an image display apparatus such as a television receiver. In the remote control apparatus, as disclosed in, for example, U.S. Pat. No. 5,235,328, there has been known a technique such that an IC card or a memory card in which various different data has been written is detachably inserted to a transmitter, namely, a remote commander of the remote control apparatus in order to change a function of the remote commander of the remote control apparatus. According to the technique disclosed in U.S. Pat. No. 5,235,328, however, the function of the remote commander can be merely changed and a function of the apparatus on the side to be controlled by the remote commander is not changed.

In recent years, among television receivers, there is an apparatus such that not only a television broadcasting wave is merely received and a video image is displayed but also it can be used as a terminal to obtain various information by being connected to an information network such as the Internet. Sometimes the television receiver which can be connected to such an information network is called an Internet TV.

In a manner similar to ordinary personal computers, a function to connect the Internet TV to the information network is provided as application software for the internet TV. There is a case where the version of this kind of application software is updated as necessary. Further, there is a case where services which are presented from this kind of information network are changed to various services.

In the television receiver which can be connected to such an information network, therefore, it is desirable that the function of the television receiver can be changed in accordance with the change of the services which are presented from the information network. That is, if a control program to control the operation of the television receiver can be easily updated or changed as necessary, the functions and a use efficiency of this kind of image display apparatus can be further improved.

In recent years, there is a technique such that data of a still image photographed by a digital camera or a motion image of a relatively short time photographed by a video camera is recorded to an IC card, the IC card is removed from the camera and connected to a personal computer via a predetermined adaptor, and a video image is displayed on a display of the personal computer. In order to watch the video image recorded in the IC card, however, a power source of the personal computer is turned on and predetermined operations have to be performed after the personal computer is activated. There is such an inconvenience that it takes time and troublesomeness. Accordingly, if the image recorded in the IC card can be easily watched by using the television receiver, it is convenient.

The invention is made in consideration of the above problems and it is an object of the invention to provide a remote control apparatus which can easily update or change a control program to control the operation of an image display apparatus such as a television receiver as necessary and to provide an image display apparatus which is remote controlled by the remote control apparatus.

Another object of the invention is to provide a remote control apparatus whereby an image recorded in an IC card can be easily watched by using a television receiver and to provide an image display apparatus which is remote controlled by the remote control apparatus.

DISCLOSURE OF INVENTION

According to the present invention, there is provided a remote control apparatus for controlling the operation of control-target equipment by transmitting a remote control signal from a remote control transmitter to the control-target equipment, characterized in that the remote control transmitter comprises: a loading member for detachably loading an IC card in which predetermined data to be transmitted to the control-target equipment has been recorded into the remote control transmitter; and a control unit for reading the predetermined data recorded in the IC card when the IC card is loaded into the remote control transmitter and transmitting the data to the control-target equipment.

The predetermined data can be data to update control program for controlling the operation of the control-target equipment.

The control-target equipment can be an image display apparatus.

The image display apparatus can display a menu picture plane to select a function of the image display apparatus. The predetermined data can be data for changing the display of the menu picture plane.

The predetermined data can be video data to be reproduced by the image display apparatus.

The predetermined data can be video data and audio data to be reproduced by the image display apparatus.

According to the invention, there is provided an image display apparatus which is controlled by the foregoing remote control apparatus, including means for receiving predetermined data which has been recorded in an IC card and which is transmitted from the remote control transmitter into/from which the IC card in which the predetermined data has been recorded is detachably loaded, and updating a control program.

In the remote control apparatus, if the IC card is detachably loaded to the remote control transmitter and data recorded in the IC card is transmitted from the remote control transmitter to the control-target equipment, a control program to update the version of the control program for the control-target equipment recorded in the IC card can be transmitted to the control-target equipment. Consequently, the control program or the like for the control-target equipment can be easily updated by a remote operation. When video data recorded in the IC card is transmitted to the image display apparatus, an image recorded in the IC card can be easily watched.

In the image display apparatus which is controlled by the remote control apparatus in which the IC card has been detachably loaded, if a control program to update the version of the control program for the control-target equipment which is transmitted from the remote control transmitter of the remote control apparatus and has been recorded in the IC card is transmitted to the control-target equipment, the version of the function of the image display apparatus can be easily updated by the remote operation.

BRIEF DESCRIPTION OF DRAWINGS

FIG. 6 is a schematic diagram showing a sub menu picture plane.

FIG. 7 is a schematic diagram showing a menu picture plane updated in correspondence to the menu picture plane of FIG. 6.

BEST MODE FOR CARRYING OUT THE INVENTION

Although the following explanation will be made with respect to a television receiver as an example, it is merely illustrated and the invention is not limited to it.

Figure 1:
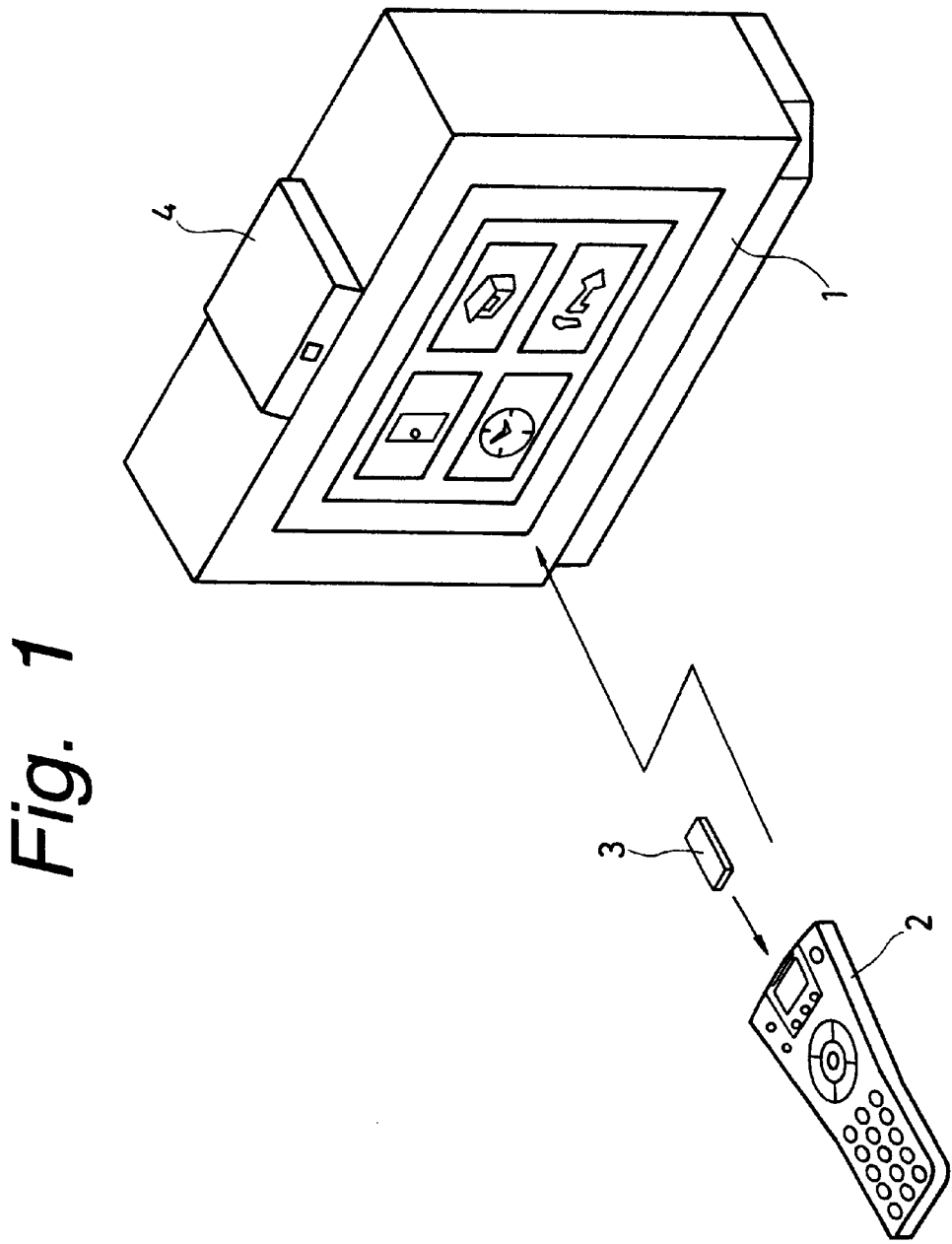
FIG. 1 is a perspective view showing constructions of a television receiver and a remote commander according to an embodiment of the invention.

FIG. 1 is a perspective view showing a television receiver according to an embodiment of the invention together with its peripheral construction. The operation of a television receiver 1 can be controlled by remote control. That is, infrared rays modulated by different codes corresponding to various functions such as on/off of a power source, switching of a reception channel, volume control, and the like are transmitted from a remote commander 2 constructing a transmitting apparatus of a remote control apparatus to a receiving apparatus 4 provided for the television receiver 1 side, thereby performing the remote control.

The television receiver 1 not only merely receives television broadcasting waves and displays video images but also can be used as a terminal for obtaining various information by being connected to an information network such as the Internet or the like. Therefore, in the television receiver 1 according to the embodiment of the present invention, the reception of the television broadcasting waves and the connection to the information network can be switched by the remote commander 2.

In the television receiver according to the embodiment of the invention, in order to enable a control program for controlling the operation of an image display apparatus such as a television receiver to be easily updated or changed as necessary or to enable video images and audio sound recorded in an IC card 3 to be easily reproduced by using the television receiver, the IC card 3 in which predetermined data such as control data, video data, audio data, and the like has been written is detachably provided for the remote commander 2.

In the remote control apparatus according to the embodiment of the invention, the IC card 3 in which the predetermined data has been written is detachably provided for the remote commander 2.

The predetermined data is, for example, data of a control program to change the function of the remote commander 2, data of a control program to change the operation of the television receiver 1, data of an image which is displayed in the television receiver 1, data of an audio sound which is reproduced by the television receiver 1, and the like.

The predetermined data, data which is transmitted from the remote commander 2 to the receiving apparatus 4 of the television receiver 1 is transmitted by a format similar to that of a remote control signal to the television receiver 1 or a unique format.

Figure 2:
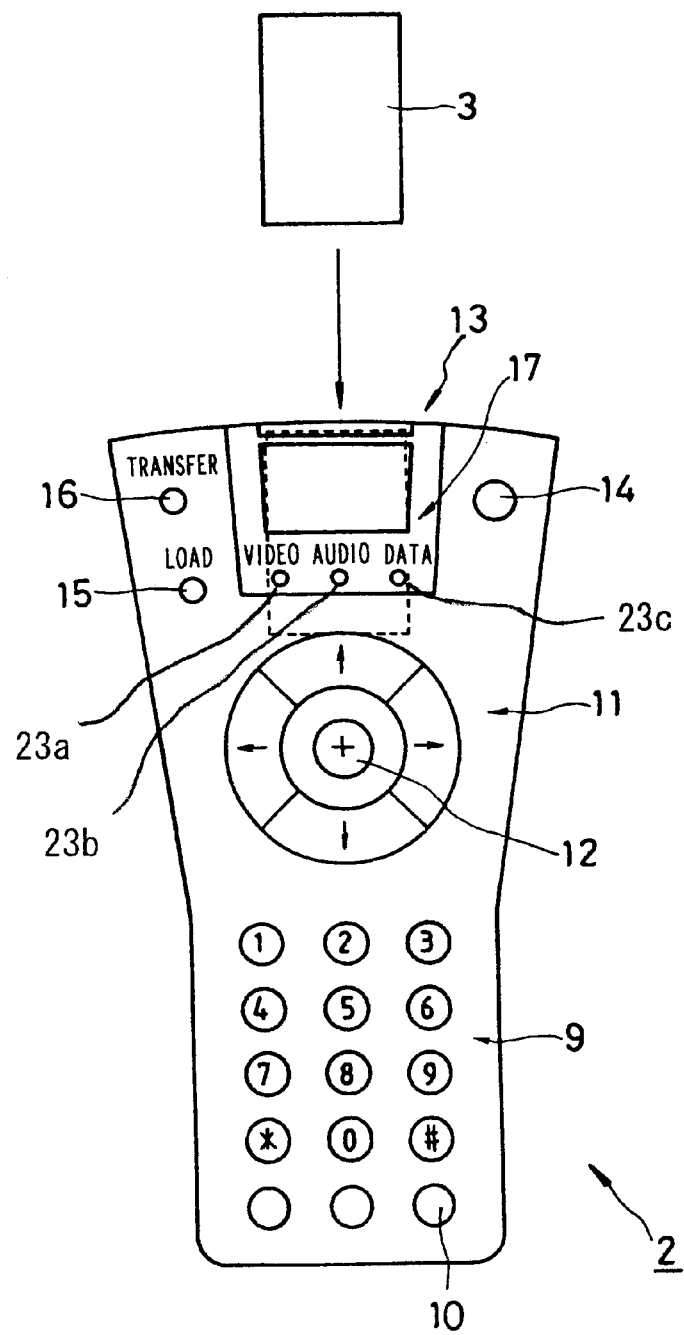
FIG. 2 is a plan view showing the remote commander.

FIG. 2 is a plan view showing the remote commander 2. The remote commander 2 remote controls the television receiver 1 by infrared rays. The remote commander 2 can load the IC card 3. In the IC card 3, as will be explained in detail hereinatter data of the control program, video data of still images and motion images, and the like have been recorded in a state where they were compressed by a predetermined format such as JPEG (Joint Photographic Experts Group), MPEG (Moving Picture Experts Group), or the like. The data recorded in the IC card 3 is temporarily loaded in the main body of the remote commander 2 and, after that, it is transmitted to the television receiver 1. On the television receiver 1 side, an updating of the control program, a decompressing process, and an image display are performed on the basis of the data.

The remote commander 2 is formed in a rod shape whose front edge is widened. An operator 9 of numerals, an operator 10 for opening a menu picture plane, and the like are arranged on the root side. An operator 11 for moving a cursor or the like in the lateral and vertical directions is further arranged in a ring shape in the remote commander 2. An operator 12 for determining a selection item is arranged at the center of the operator 11. A slot 13 into which the IC card 3 is inserted is formed on the front edge side of the remote commander 2. A transmitting unit for the infrared rays is formed on the lower side of the slot 13. In the remote commander 2, a power switch 14, an operator 15 for loading data for management or the like from the IC card 3, and an operator 16 for transferring data of the IC card 3 are arranged on both sides of the slot 13.

A display unit 17 constructed by a liquid crystal display apparatus or the like showing data or the contents themselves or an outline of a file recorded in the IC card 3 by an image or characters is further formed on the front edge side of the operator 11 of the remote commander 2. When the IC card 3 is loaded in the remote commander 2, data indicative of the kind of file recorded in the IC card 3 is loaded to the remote commander 2. The kinds of various data such as video data showing still images or motion images, audio data indicative of audio sound, control program, and the like are displayed by lighting on light emitting diodes 23a, 23b, and 23c.

Figure 3:
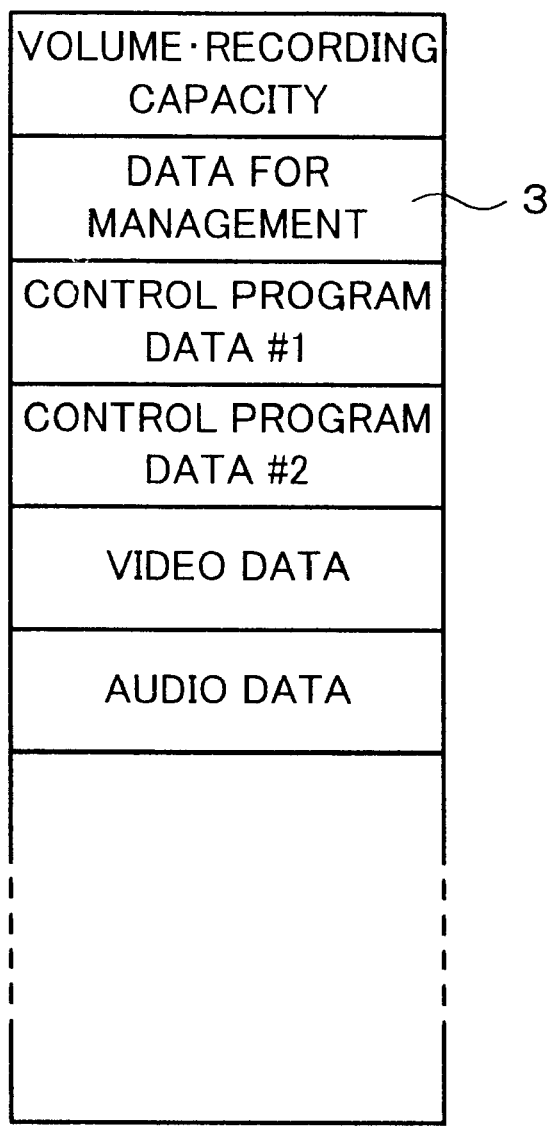
FIG. 3 is a schematic diagram showing a format of an IC card.

FIG. 3 is a schematic diagram showing a memory space of the IC card 3. In the IC 3, the volume of the IC card, the whole recording capacity, and the like are recorded in the head area of the memory space, data for management is subsequently recorded, and a file of the control program, a file of the video data, a file of the audio data, and the like are recorded in the residual areas. As for the management data, data to manage a user area is recorded. Specifically, addresses of the files, the kind of file (kinds of video data, audio data, text data, and the like and a format of compression or the like), the residual recording capacity, and the like are recorded. Desired data can be loaded to the IC card 3 by accessing to the user area on the basis of the management data.

Figure 4:
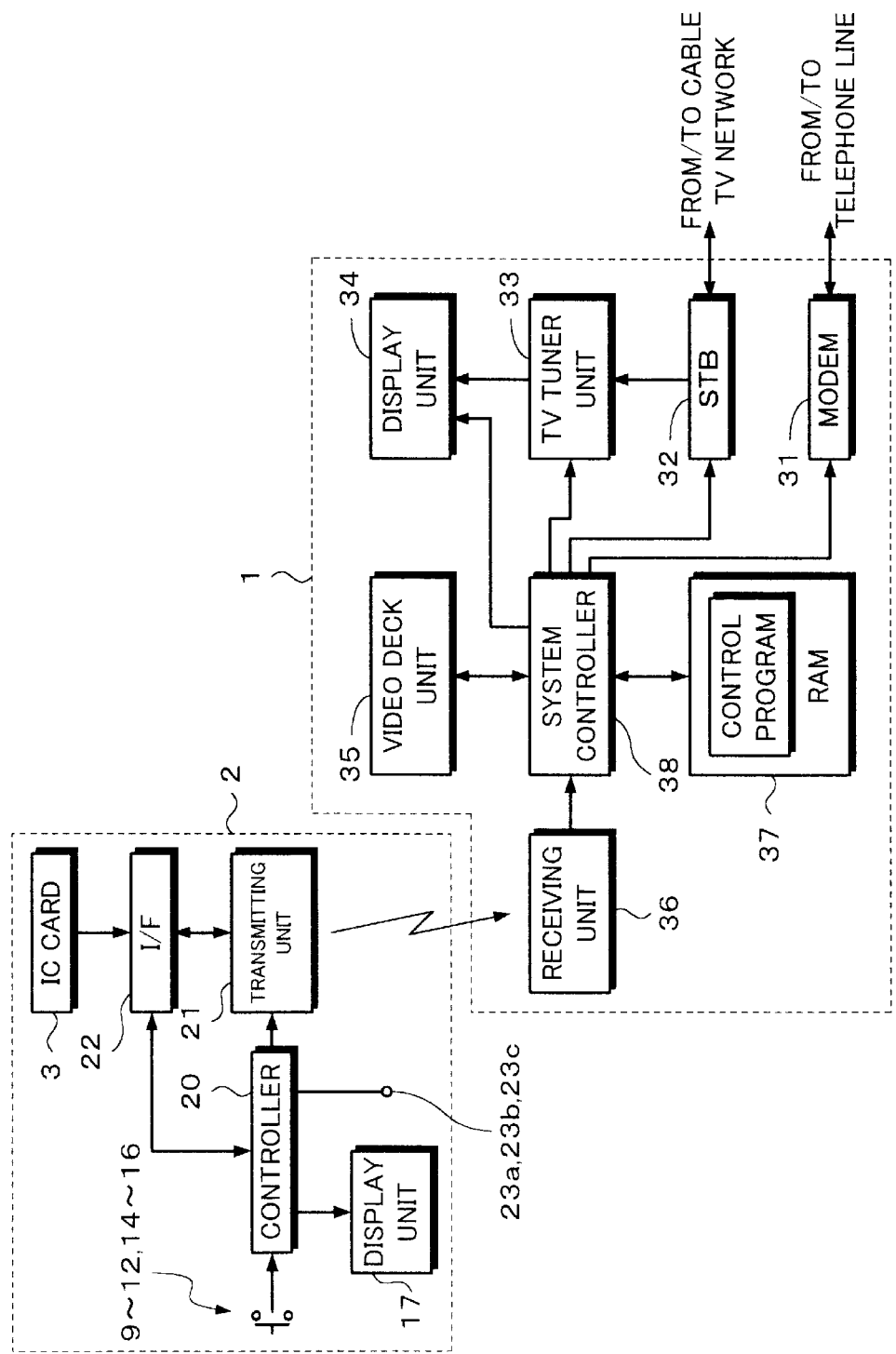
FIG. 4 is a block diagram showing the television receiver and the remote commander according to the embodiment of the invention.

FIG. 4 is a block diagram showing the television receiver 1 and remote commander 2. The remote commander 2 remote controls the television receiver 1 on the basis of control by a controller 20 which is operated in response to the operations of the operators 9 to 12, 15, and 16.

In the remote commander 2, the controller 20 is constructed by a microcomputer, controls the operation of a transmitting unit 21 in accordance with the operations of the operators 9 to 12, 15, and 16, and transmits a remote control signal to the television receiver 1.

In the remote commander 2, when the loading of the IC card 3 is detected through an interface (I/F) 22, the interface 22 is controlled by the operation of the operator 15 for the loading, thereby loading the management data from the IC card 3. When the loading is completed, a corresponding one of the light emitting diodes 23a, 23b, and 23c for displaying the kinds of video, audio, and data is allowed to perform the light emission on the basis of the information indicative of the kinds of files included in the management data. The controller 20 drives the display unit 17. When the user operates the operator 16 for transfer in this state, the remote commander 2 further controls the interface 22 so as to sequentially transmit the management data and the data of the files recorded in the IC card 3 to the transmitting unit 21.

The interface 22 monitors a predetermined terminal voltage in a connector to which the IC card 3 is connected, thereby detecting a loading or removal of the IC card 3 by a change in terminal voltage. When the loading of the IC card is detected as mentioned above, the IC card 3 is accessed, thereby detecting whether the IC card 3 has correctly been loaded or not. When it is correctly loaded, this fact is notified to the controller 20. On the contrary, when the removal of the IC card 3 is detected by the change in terminal voltage, this fact is also notified to the controller 20.

The interface 22 further loads the management data of the IC card 3 by the control of the controller 20, notifies the controller 20 of the loaded management data, further, sequentially loads the data of the files recorded in the IC card 3, and transmits it to the transmitting unit 21.

The transmitting unit 21 transmits a remote control signal by the infrared rays by the control of the controller 20, thereby remote controlling the television receiver 1. The transmitting unit 21 further modulates the data of the IC card which is transmitted by the interface 22 by a predetermined modulating system and transmits it by infrared rays by a similar control of the controller 20.

Consequently, the remote commander 2 remote controls the television receiver 1 and transmits the various data recorded in the IC card 3 to the television receiver 1.

In the television receiver 1, a modem 31 transmits desired data through a telephone line by a control of a system controller 38, thereby transmitting or receiving an E-mail by being connected to, for example, the Internet.

A settop box (STB) 32 is connected to a network of a cable television and selects various programs from this network by the control of the system controller 38. The settop box 32 outputs reception signals of the selected programs to a television tuner unit 33.

The television tuner unit 33 selects a desired broadcasting channel by the control of the system controller 38 and outputs video data and audio data of the selected channel to a display unit 34. When the user selects the cable television, the television tuner unit 33 processes the reception signals inputted from the settop box 32 in place of the broadcasting channel by the control of the system controller 38 and outputs video data and audio data of the selected channel to the display unit 34.

The display unit 34 processes video data which is outputted from the television tuner unit 33 or video deck unit 35 and displays it onto a predetermined display picture plane. The display unit also processes audio data which is similarly obtained and generates it from speakers. When menu picture planes are selected by the user, the display unit 34 further displays windows by the menu picture planes onto the picture plane which is at present being displayed by the control of the system controller 38.

The video deck unit 35 switches the operation by the control of the system controller 38 and records various programs which can be received by the television receiver 1, or reproduces the recorded programs and outputs them.

A receiving unit 36 receives the infrared rays transmitted from the remote commander 2 and processes a reception result. Thus, the receiving unit 36 obtains the remote control signal outputted from the remote commander 2 and various data and notifies the system controller 38 of them.

The system controller 38 has a function to control the operation of the whole television receiver 1 and is constructed by a microcomputer. That is, the system controller 38 executes a control program recorded in a random access memory 37 in accordance with the notification of the receiving unit 36, thereby controlling the operation of the television receiver 1 in response to the operation of the remote commander 2.

Figure 5:
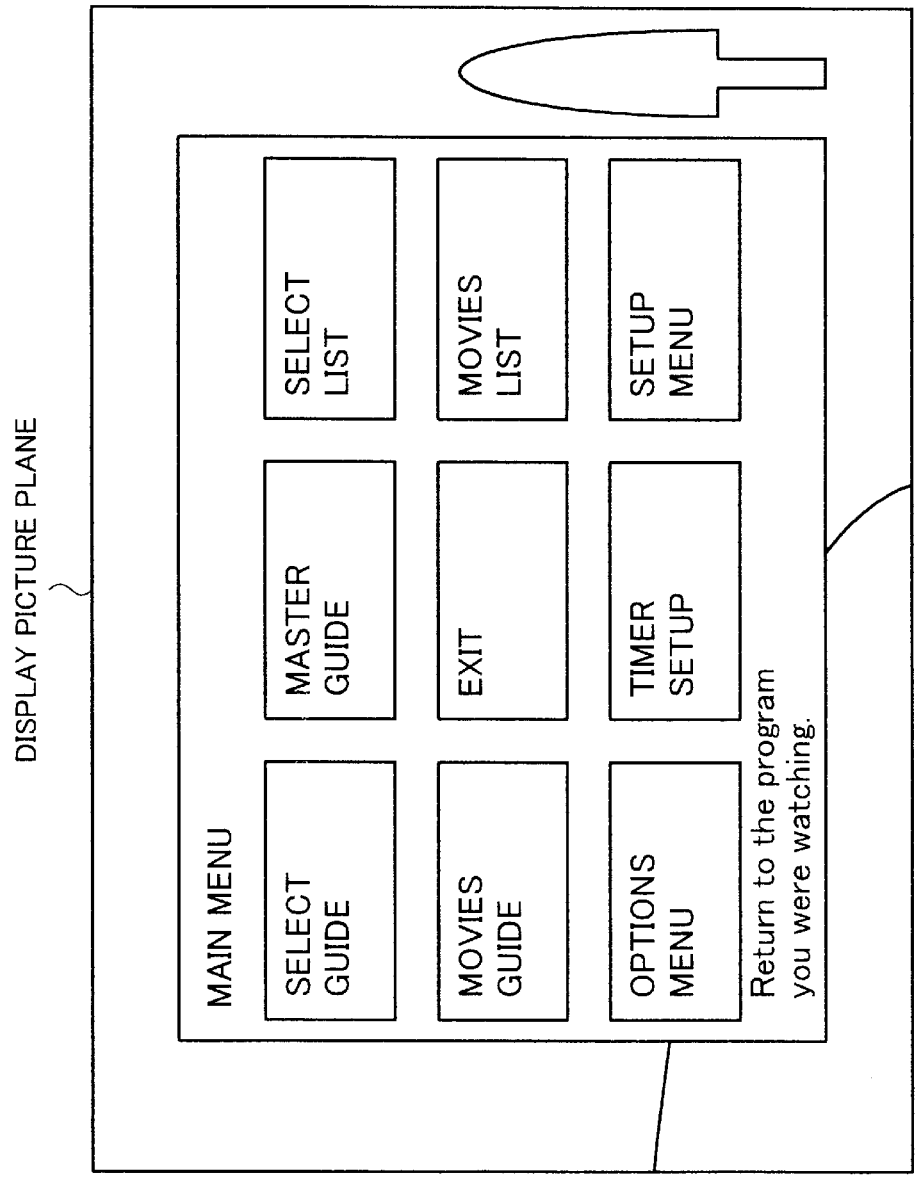
FIG. 5 is a schematic diagram showing a main menu picture plane.

That is, when the user selects a desired channel by operating the operator 9 of numerals, control commands are issued to the television tuner unit 33 and settop box 32 in response to the selection, thereby selecting a desired program. In the controls, when the user operates the operator 10 to open the menu picture plane by the remote commander 2, the system controller 38 displays a window of a main menu shown in FIG. 5 in response to the operation.

A display (MAIN MENU) showing the main menu and a message to promote the user to operate are displayed in the window of the main menu. Various selection menus are displayed. The selection menus are formed by: a selection menu of an operation guide (SELECT GUIDE); a main selection menu of the operation guide (MASTER GUIDE); a menu of a list of the operations which can be performed (SELECT LIST); a guide menu of movies by the cable television (MOVIES GUIDE); a menu to exit from the main menu picture plane (EXIT); a list menu of movies by the cable television (MOVIES LIST); a menu of options (OPTIONS MENU); a setup menu of a timer (TIMER SETUP); and a setup menu of the control program (SETUP MENU).

In a default state, the system controller 38 displays the menu (EXIT) to exit from the main menu picture plane by a display color different from those of the other menus. Further, when the operator 11 to move the cursor or the like in the right/left and up/down directions is operated in the remote commander 2, the menu selected in response to the operation is displayed by a display color different from those of the other menus, thereby enabling the user to freely select a desired menu by operating the operator 11. When the operator 12 for determination is operated after the desired menu was selected as mentioned above, the system controller 38 displays a sub menu picture plane corresponding to each menu picture plane and displays the list of movies or the like as necessary.

FIG. 6 is a schematic diagram showing a display picture plane in the case where the menu of the list of the operations which can be performed (SELECT LIST) is selected and the operator 12 for determination is operated. In the display picture plane of the menu (SELECT LIST), the system controller 38 displays a menu to exit from this display picture plane (EXIT), a menu of an E-mail (MESSAGE), a setting menu for timer recording in the video deck unit 35 (TIMER/REC), and a menu to limit the monitor of a specific program (LOCK & LIMITS).

In a manner similar to the operation in the main menu picture plane, for example, when the menu of an E-mail (MESSAGE) is selected, the system controller 38 displays a subsequent operating picture plane and drives the modem 31 in response to the operation of the user, thereby transmitting or receiving the E-mail. When the picture plane of the setting menu for timer recording (TIMER/REC) is selected, the corresponding operating picture plane is displayed and a timer recording reservation is accepted.

On the other hand, in the main menu picture plane, when the setup menu of the control program (SETUP MENU) is selected, the system controller 38 displays a predetermined display picture plane. In the display picture plane, the system controller 38 explains, an operating procedure for setup. In case of the embodiment, after the IC card 3 for setup was loaded into the remote commander 2, the system controller 38 displays a message showing that the operator 15 for loading and the operator 16 for transfer are sequentially operated.

When the management data of the IC card 3 and the data of the control program are transmitted from the remote commander 2 and notified from the receiving unit 36 by the operation of the user according to the display of the display picture plane, the system controller 38 updates the control program stored in the random access memory 37 by the notified control program, thereby updating the version of, for example, the control program. At this time, the system controller 38 switches the display picture plane in accordance with the management data which is transmitted together with the data of the control program and receives the operation of the user, thereby allowing the user to confirm the updating control program.

Thus, the system controller 38 can change, for example, the menu picture plane by titles mentioned above with respect to FIG. 6 to a menu picture plane by symbols as shown in FIG. 7.

In the above construction, a remote control signal by the infrared rays is transmitted from the transmitting unit 21 toward the television receiver 1 by the operation of the operator 14 of the power source in the remote commander 2. In the television receiver 1, the remote control signal is received by the receiving unit 36 and a power source by the control of the system controller 38 based oh the reception result is turned on. A remote control signal is similarly transmitted by the remote commander by the operation of the operator 9 of numerals. By this remote control signal, the operation of, for example, the television tuner unit 33 is switched and the channel is switched.

In the remote commander 2 to remote control the television receiver as mentioned above, when the operator 10 of menu is operated, the main menu picture plane (FIG. 5) is displayed on the television receiver 1 by the remote control. In this state, when the operator 11 is operated in the remote commander 2, the display of each menu in the menu picture plane is switched. In a state where the desired menu is selected by switching the display color of the menu as mentioned above, by operating the operator 12 for determination, the selected menu can be executed.

That is, for example, when the menu of the list of the operations which can be performed (SELECT LIST) is selected and the operator 12 for determination is operated, the subsequent menu picture plane (FIG. 6) is displayed. In the subsequent menu picture plane, by similarly selecting a desired menu and operating the operator 12 for determination, the timer recording reservation, an E-mail, or the like can be performed.

On the other hand, when the setup menu of a control program (SETUP MENU) is selected, in the television receiver 1, after the IC card 3 was loaded into the remote commander 2, a message to sequentially operate the operator 15 for loading and the operator 16 for transfer is displayed. When the IC card 3 is loaded into the remote commander 2 in response to the message, with respect to the remote commander 2, the loading of the IC card 3 is detected by the interface 22 and notified to the controller 20.

When the operator 15 for loading is operated in this state, the management data recorded in the IC card 3 is loaded (FIG. 3). The kinds of files recorded in the IC card 3 are displayed by the display unit 17 and light emitting diodes 23a, 23b, and 23c. Further, by the operation of the operator 16 which is executed by confirming the display, the management data and the data of the files recorded in the IC card 3 are transmitted to the television receiver 1.

In the television receiver 1, thus, the control program in the RAM 37 is updated by the transmitted data of the files and the control program is updated in a manner such that, for example, the menu picture plane (FIG. 6) by titles is changed to the menu picture plane (FIG. 7) by symbols.

According to the above construction, by transmitting the data recorded in the IC card 3 to the television receiver 1 by the remote commander 2 or by updating the control program by the data transmitted as mentioned above, the control program for version-up or the like is provided by the IC card 3 and the control program can be easily updated.

Although the foregoing embodiment has been mentioned with respect to the case of changing the display of the menu picture plane by the updating of the control program, the invention is not limited to it but can be widely applied to the simple version-up of the control program and, further, the addition of a function and the like.

Although the foregoing embodiment has been mentioned with respect to the case of updating the version of the control program of the television receiver, the invention is not limited to it but can be also further widely applied to a case of updating the versions of control programs of various control-target equipment, a loading of a setup program, or the like.

according to the invention as mentioned above, by constructing the remote control apparatus so that the IC card can be loaded and transmitting the data recorded in the IC card in a manner similar to the remote control signal, for example, the version-up of the control-program can be easily executed.

What is claimed is:

1. A remote control apparatus for controlling an operation of a control-target equipment by transmitting a remote control signal from a remote control transmitter to said control-target equipment, said remote control apparatus comprising:

a loading member for detachably loading into said remote control transmitter an IC card wherein predetermined data including management data, a control program, and a data file to be transmitted to said control-target equipment has been recorded; and a first control unit for reading said predetermined data recorded on said IC card and transmitting said predetermined data to said control-target equipment when said IC card is loaded into said remote control transmitter; and said control-target equipment comprising:

a receiver for receiving said predetermined data transmitted by said remote control apparatus; and a second control unit for controlling said receiver, for updating an existing program with said control program in a RAM, and for executing said control program so that program steps of said control program are executed to manipulate said data file so that said data file is utilized by said control-target equipment.

2. The remote control apparatus according to claim 1, wherein said control-target equipment is an image display apparatus.

3. The remote control apparatus according to claim 2, wherein said image display apparatus displays a menu picture plane for selecting a function of said image display apparatus and said predetermined data includes data for changing a display of said menu picture plane.

4. The remote control apparatus according to claim 2, wherein said data file includes video data and audio data to be reproduced by said image display apparatus.

* * * * *